United States Patent [19]
Hendren

[11] 3,770,148
[45] Nov. 6, 1973

[54] SCREW CONVEYOR SYSTEM FOR DURABLE PRESS APPARATUS

[75] Inventor: Charles W. Hendren, Reading, Ohio

[73] Assignee: McGraw-Edison Company, Elgin, Ill.

[22] Filed: Feb. 18, 1972

[21] Appl. No.: 227,409

[52] U.S. Cl. .................. 214/17 R, 34/236, 198/89, 198/213
[51] Int. Cl. ............................................ B65g 65/46
[58] Field of Search .................. 214/17 R, 18 R; 198/213, 89; 34/236, 105

[56] References Cited
UNITED STATES PATENTS

| | | | |
|---|---|---|---|
| 3,644,085 | 2/1972 | Beeley et al. ................... | 34/37 X |
| 902,530 | 10/1908 | Gustavsen ........................ | 198/213 |
| 2,620,917 | 12/1952 | Dahlberg .......................... | 198/213 |
| 3,252,200 | 5/1966 | Gulde et al. .................... | 214/18 R X |
| 3,178,012 | 4/1965 | Weiss et al ..................... | 198/213 |

FOREIGN PATENTS OR APPLICATIONS

| | | | |
|---|---|---|---|
| 1,531,081 | 7/1969 | Germany ......................... | 198/213 |
| 1,805,034 | 7/1970 | Germany ......................... | 198/213 |

*Primary Examiner*—Evon C. Blunk
*Assistant Examiner*—Bruce H. Stoner, Jr.
*Attorney*—George H. Fritzinger

[57] ABSTRACT

A durable press apparatus has an oblong treating chamber with doors at the ends and with an internal screw conveyor for receiving wire hangers for articles to be treated. The screw conveyor comprises a pipe having a spiral peripheral groove or thread thereon for progressively advancing the hangers as the conveyor is rotated. The conveyor is supported by open-sided bearings each comprising a top bearing segment and two unopposed bottom segments to allow different types of hangers to move easily through the bearings. At the ends of the chamber there are load and unload racks having screw conveyors thereon engageable with the adjacent ends of the internal conveyor when the racks are shifted towards the chamber respectively into load and unload positions. The entire conveyor system is driven from one of the racks to load the chamber from one end simultaneously as the chamber is unloaded from the other end.

16 Claims, 14 Drawing Figures

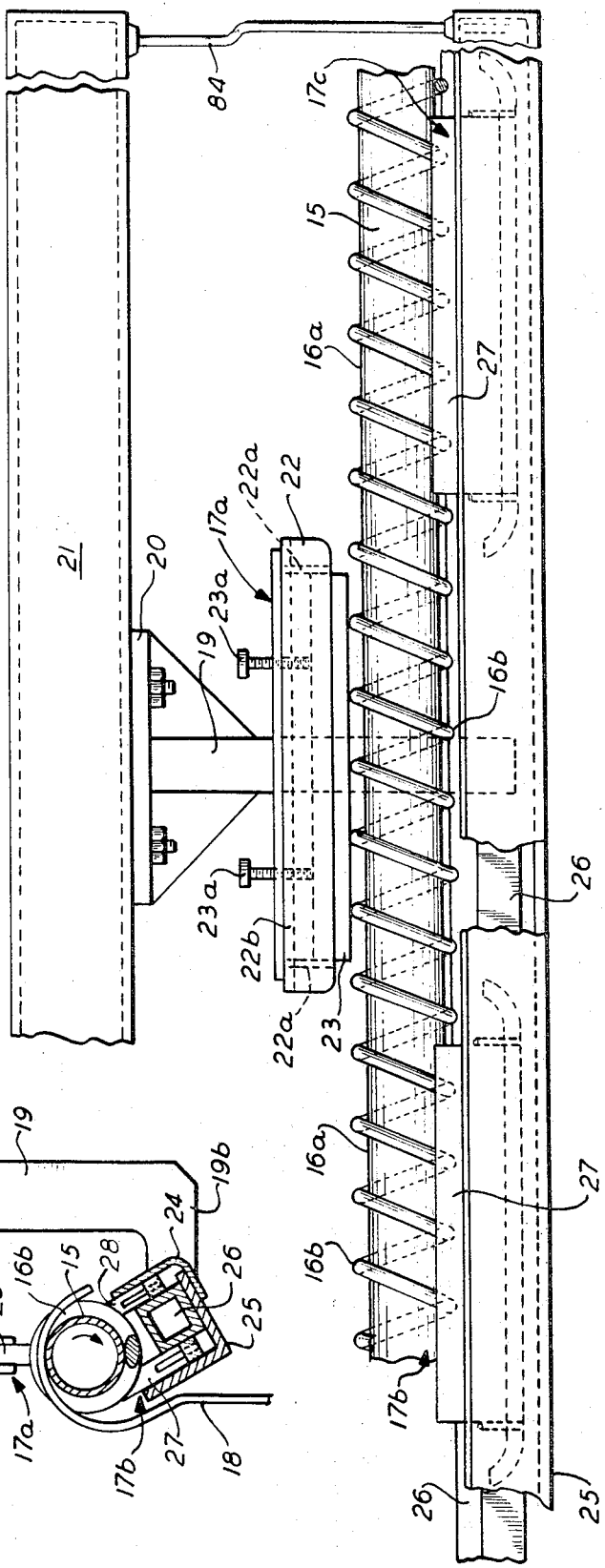

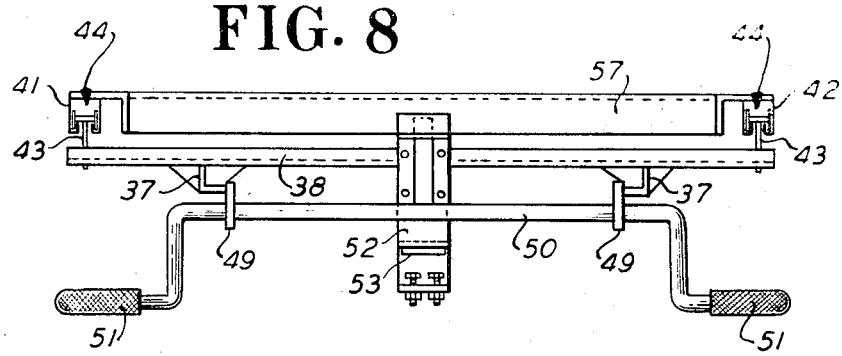
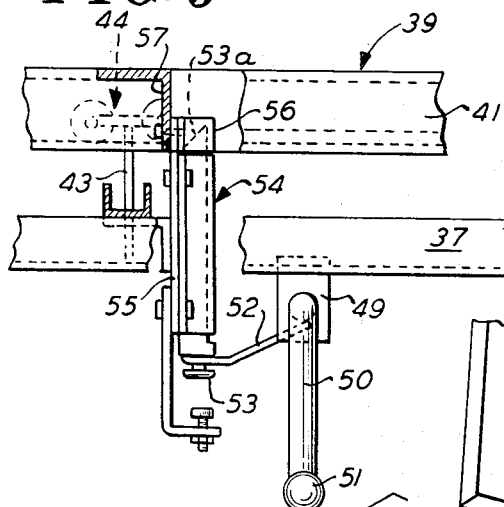
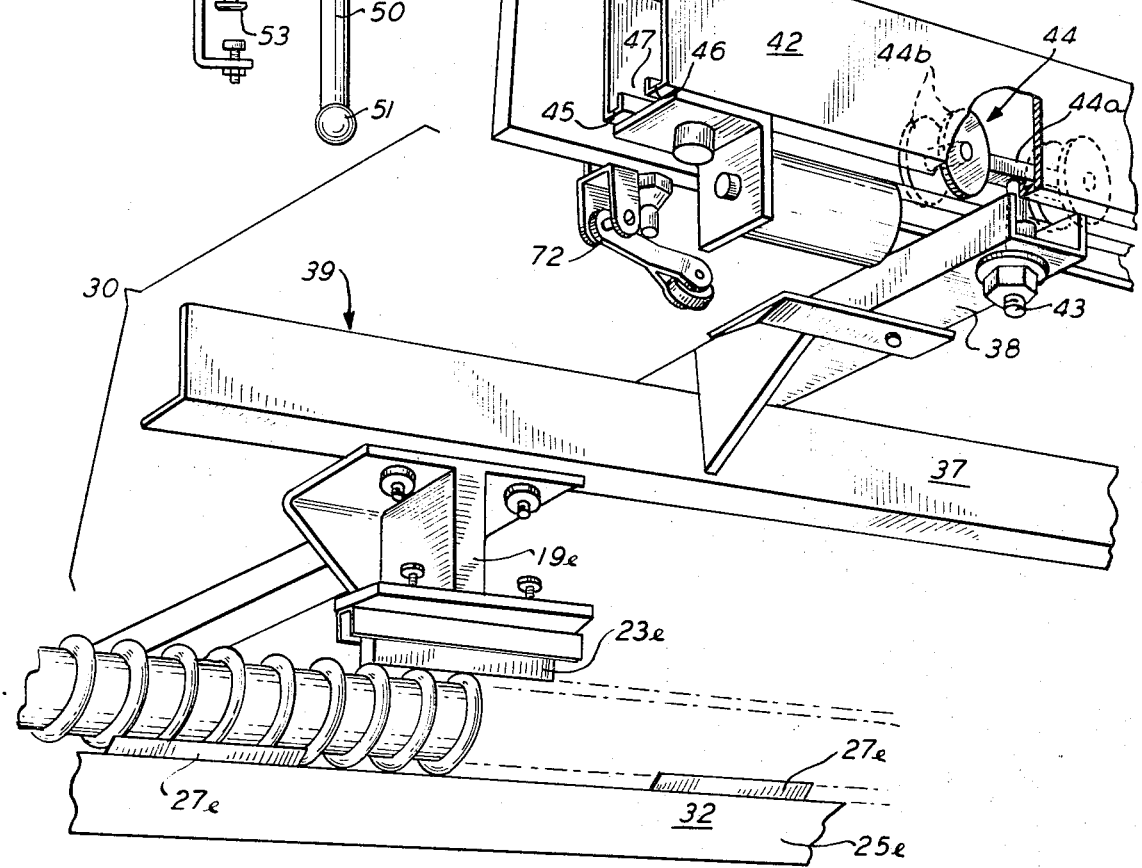

SCREW CONVEYOR SYSTEM FOR DURABLE PRESS APPARATUS

The present conveyor system is adapted especially for use with durable press apparatus of the character disclosed in the pending Forg et al. application Ser. No. 179,781, filed Sept. 13, 1971, and entitled DURABLE PRESS METHOD AND APPARATUS. However, no unnecessary limitation of the present conveyor system to such apparatus is intended since the present conveyor system is usable in many other applications where it is desired to convey hangered articles.

An object of the invention is to provide an improved screw conveyor for hangered garments wherein the conveyor is supported by open-sided bearings each comprising a single top bearing segment and two unopposed bottom bearing segments to enable easier passage of hangers through the bearings.

Another object is to provide such improved conveyor wherein the bearing segments comprise plastic bearing members supported in slotted holders to permit greater variation in temperature and humidity conditions.

Another object is to provide a conveyor system for a durable press apparatus which permits loading a treating chamber at one end simultaneously as the chamber is unloaded at the other end.

Another object is to provide such conveyor system comprising loading and unloading conveyor racks at the opposite ends of the treating chamber shiftable from the chamber to allow the chamber to be opened and back to the chamber into drive coupling engagement with the internal conveyor of the treating chamber.

Another object is to provide such load-unload conveyor system wherein the whole system is driven from one of the conveyor racks.

Another object is to provide such system with conveyor racks having individual drive motors controlled according to the coupling engagement of the conveyor racks with the internal conveyor.

These and other objects of the invention reside in providing a conveyor system for garment-treating apparatus which permits easy and economical loading and unloading of the treating chamber while maintaining the garments in a clean condition.

In the description of the invention reference is had to the accompanying drawings, of which:

FIG. 2 is a side elevation showing one of the bearings for the internal screw conveyor;

FIG. 3 is a side view of one of the hanger brackets for the bearings;

FIG. 7 is a perspective view of the inner end of the loading rack;

FIG. 8 is a view showing the latch for holding a rack in this inner engaged position;

FIG. 9 is a side view of the latch for each rack;

Figure 1:
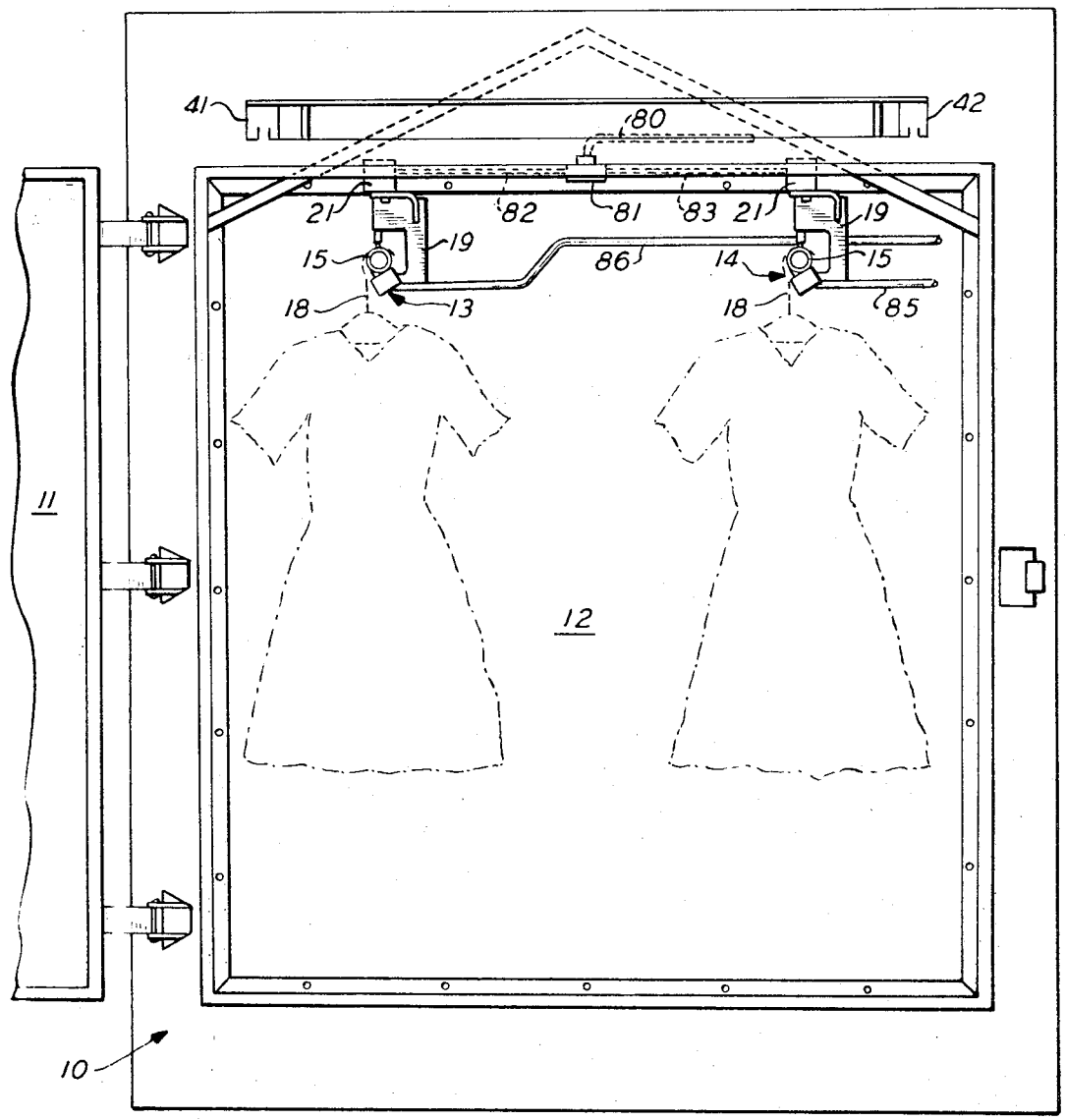
FIG. 1 is an end view of a treating chamber with internal screw conveyors and with loading and unloading doors at the ends.
Figure 1A:
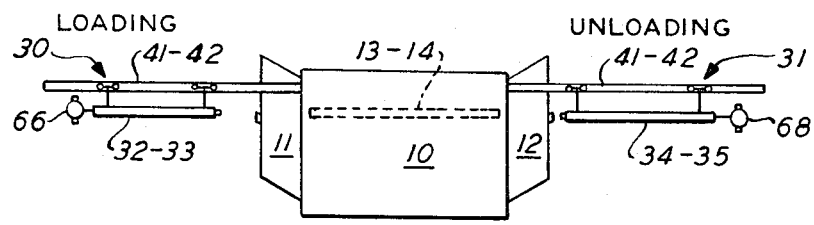
FIG. 1A is a sketch illustrating the overall conveyor system according to the invention.

A durable press apparatus as before referred to comprises an elongate treating oven or chamber 10 for subjecting garments to an atmosphere of formaldehyde and sulphur dioxide gases and steam, means for next heating the chamber to a temperature of the order of 250°F. and circulating means for then flushing the chamber with cool outside air before the garments are removed. The present invention is adapted especially for such a treating chamber having loading and unloading doors 11 and 12 at its opposite ends, and having two internal screw conveyors 13 and 14 along the length thereof. (See FIG. 1). In the present design, each screw conveyor comprises a hollow pipe 15 having a wire helix 16 wound thereon and welded thereto (FIG. 2). Each bearing 17 for the conveyor is open-sided so that wire hangers 18 engaging the spiral groove 16a of the conveyor may travel through the bearings as the conveyor is rotated. Each bearing 17 comprises one upper bearing segment 17a and a pair of separate unopposed lower segments 17b and 17c spaced beyond the ends of the upper segment.

The segments of each bearing 17 are carried by a C-shaped hanger bracket 19 having L-shaped mounting brackets 20 (FIG. 3) welded to the upper ends thereof which are in turn bolted to a steam pipe 21 of rectangular cross section clamped to the ceiling of the chamber 10. Welded to the upper leg 19a of each hanger bracket is a depending inverted U-channel 22 with stop ins 22a at the ends in which is mounted a bar-shaped bearing member 23 of plastic material, preferably, of 10 percent glass-filled Teflon because of the conditions in the chamber. This bearing member 23 rides on the screw conveyor and spans a plurality of threads of the wire helix 16. Two adjusting screws 23a threaded through the top wall 22b of the channel 22 enable the bearing member to be adjusted into even engagement with the screw conveyor.

The bottom leg 19b of the hanger bracket 19 has an angle iron 24 welded thereto which embraces a side and bottom portion of a U-shaped trough 25 extending along the full length of the screw conveyor. This trough is mounted below the screw conveyor but is shifted circumferentially 30° against the direction of rotation of the conveyor and displaced rectilinearly in the direction of rotation as shown in FIG. 3. Centrally located in the trough and extending along the length thereof is a rectangular steam pipe 26. Between this steam pipe and the side walls of the trough is a pair of bar-shaped bearing members 27 and 28 positioned along the trough beyond the ends of the upper bearing member 23 so that the bearing 17 has no opposed members. Thus, if the hook of a hanger 18 should be bent causing the hanger to be tilted as it goes through the upper bearing segment, the hanger can not strike the lower bearing segments and get caught when it is tilted. The bearing members 27 and 28 are also preferably made of 10 percent glass-filled Teflon. The upper faces of bearing members 27 and 28 are tapered at 35° and 65° respectively so that they engage the screw conveyor in a tangential relationship. These bearing members likewise span a plurality of threads 16b of the screw conveyor.

As shown in FIG. 3, the screw conveyor receives the hangers 18 from the side away from the hanger brackets 19 and is rotated in a direction tending to draw the hooks of the hangers over the conveyor rod towards the hanger brackets. Looking at the conveyor from the entry end of a bearing 17 (left side as shown in FIG. 2) the conveyor rod is turned clockwise and the threads 16b of the wire helix 16 are left-handed.

Steam of a low pressure is led from a source (not shown) through a tube 80 to a T-coupling 81 (FIG. 4) and from this coupling through tubes 82 and 83 to the upper steam pipes 21. At the far end of the pipes 21 the steam is led via tubes 84 (FIG. 2) to the adjacent ends of the pipes 26 in trough 25. After passing the length of the pipes 26 the steam is led off via tubes 85 and 86 (FIG. 1) through traps not shown.

At one end of the chamber 10 is a loading rack 30 (FIG. 5) and at the other end an unloading rack 31 (FIG. 6) of which the loading rack 30 carries a pair of screw conveyors 32 and 33 and the unloading rack a pair of screw conveyors 34 and 35. These screw conveyors are the same type as the internal conveyor above-described. Also, these external screw conveyors are supported in the same manner as in the chamber 10 by bearings 17e carried by C-shaped hanger brackets 19e but the plastic bearing members of these internal bearings — the bearing members 23e and 27e shown in FIG. 7 — are preferably made of high molecular weight polyethylene. Since the external conveyors need not be heated to avoid dripping of condensation on the garments the troughs 25e of the external conveyors may have centrally positioned solid bars instead of the steam pipes 26 and the hanger brackets 19e are bolted to overhead angle irons 37 instead of to stream pipes as in the case of the internal conveyors. The angle irons 37 for the respective racks 30 and 31 are interconnected by transverse bars 38 forming respective carriages 39 and 40 for the respective racks. These carriages are suspended from stationary overhead rails 41 and 42 (FIGS. 5, 6 and 8) by way of bolts 43 leading from the outer ends of the transverse bars 38. These bolts are secured to roller skate mechanisms 44 (FIG. 7) riding in the rails 41 and 42. For example, each rail 41 and 42 is of an inverted U-shape having flanged lips 45 and 46 which are turned inwardly from the side walls and separated by an intervening slot 47 lengthwise of the rail. The bolts 43 traverse these slots, and each skate mechanism 44 comprises a frame 44a secured to the bolt and pairs of rollers 44b which ride on the flanged lips 45 and 46 of the rails 44 and 42. Thus each conveyor rack 30 and 31 can be shifted to and from the chamber 10 to permit the doors 11 and 12 to be opened and closed. Typically, each conveyor rack is about 14' long and is shiftable through a distance of about 6' to provide a conveyor system leading about 20' from each end of the treating chamber.

Figure 5:
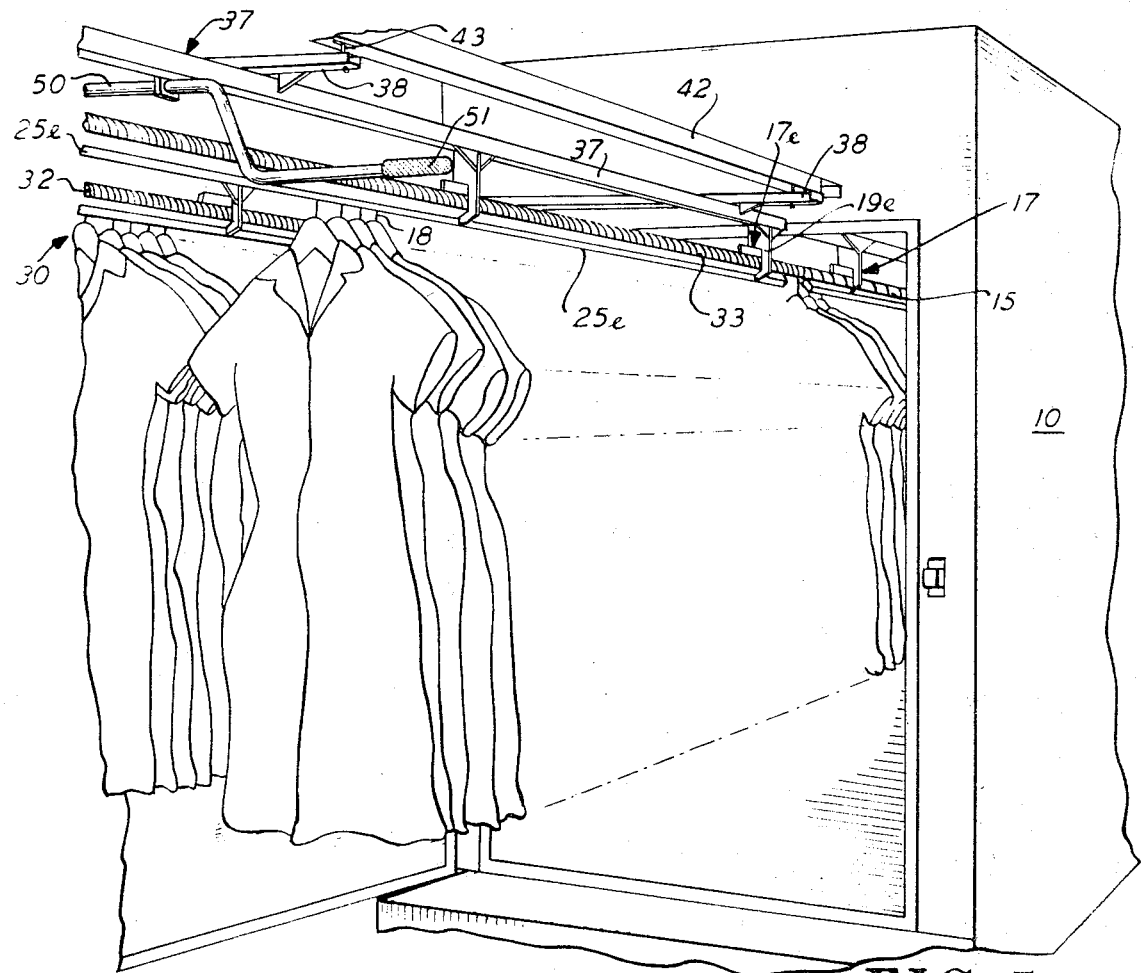
FIGS. 5 and 6 are end views of the chamber showing respectively the loading and unloading racks in operation positions.
Figure 6:
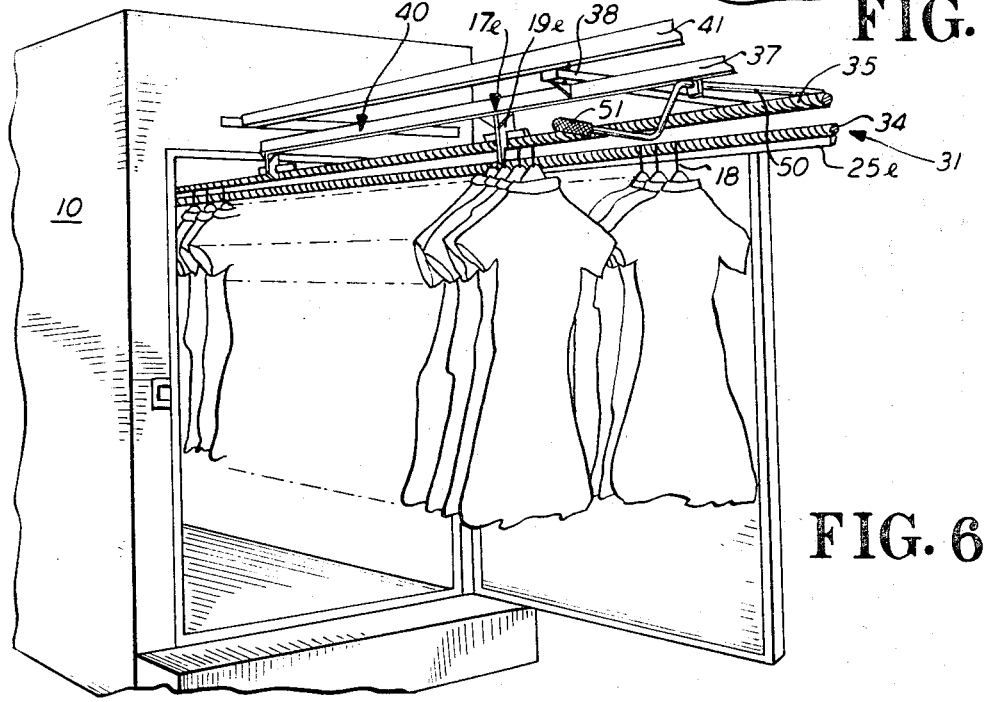

Journaled in apertured lugs 49 depending from the angle irons 37 is a cross rod 50 for each conveyor rack having crank arms at the ends forming handles 51 (FIGS. 5, 6 and 8). Secured to the cross rod 50 midway between the angle irons 37 of each conveyor rack is a latch arm 52 having a slotted end portion engaging a plunger 53 of a latch 54 bolted to a cross bar 55 also mounted on the respective carriage rack (FIG. 9). The operator can reach up and grip the handle 51 to shift the rack along the stationary rails 41 and 42 but when the rack reaches an end position at the treating chamber a beveled end portion 53a of the plunger 53 is cammed into registry with a latch keeper 56 bolted to a cross bar 57 welded between the stationary rails 41 and 42, thus latching the rack in its inner load or unload position. When the operator grips the handle 51 and moves it in a direction away from the chamber 10 the handle is at first turned to unlatch the conveyor rack and then the rack is moved by continuing outward thrust on the handle along the rails 41 and 42.

Figure 4:
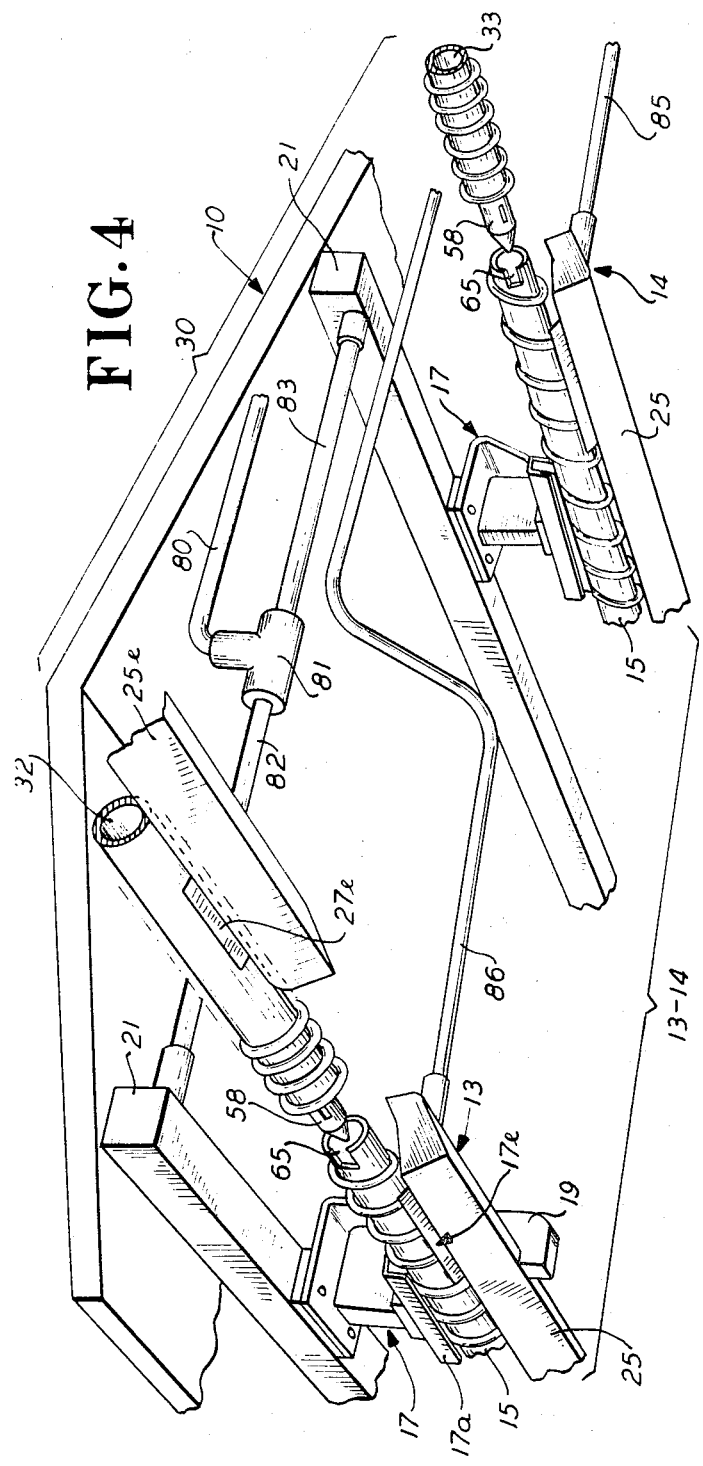
FIG. 4 is an end view of the loading end of the chamber showing the screw conveyors of a loading rack just short of engaging the internal conveyor of the chamber.
Figure 10:
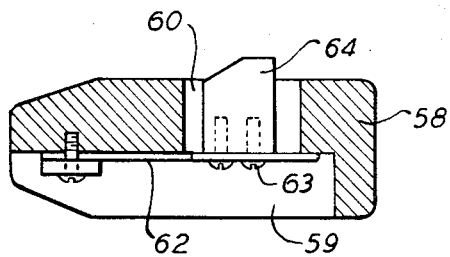
FIG. 10 is a cross-sectional view of the intercoupling pin and key between and the rack conveyors and internal conveyor.

The screw conveyors 32 and 33 on the load and unload racks 30 and 31 are mounted in alignment with the respective internal conveyors 13 and 14 of the chamber 10 (FIG. 4) and are terminated by centering pins 58 which engage the respective pipes 15 of the internal conveyors as the load and unload racks 30 and 31 are moved into their inner latched positions. Each centering pin 58 has an open-ended slot 59 (FIG. 10) running lengthwise thereof which leads to a transverse slot 60 at the base of the pin. Secured in the lengthwise slot 59 near the tip of the pin 58 is a cantilever spring 62 and secured by bolts 63 to the rear portion of each cantilever spring is a key 64 that extends crosswise through the transverse slot 60 and beyond the periphery of the centering pin. Each key has a beveled face at its outer end directed toward the outer end of the centering pin so that the key is cammed inwardly as the centering pin engages the open pipe of the internal screw conveyor. Upon thereafter rotating the external screw conveyor the same will turn relative to the internal conveyor until the key 64 comes into registration with an open-ended slot 65 in the internal conveyor (FIG. 4). When this registration occurs the key is snapped outwardly by spring force to interlock the conveyors of the external racks with the internal conveyor to provide a drive coupling therebetween. The slot 65 at each end of the internal conveyors is so oriented that when the dirve connection occurs the wire helix 16 of the internal conveyor will be in registry with the wire helix of the external conveyor.

Figure 11:
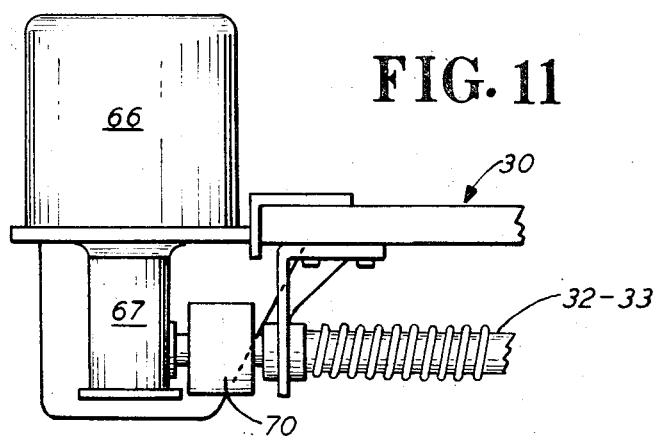
FIGS. 11 and 12 are views of the drive motors and couplings for the respective conveyors on the loading and unloading racks.
Figure 12:
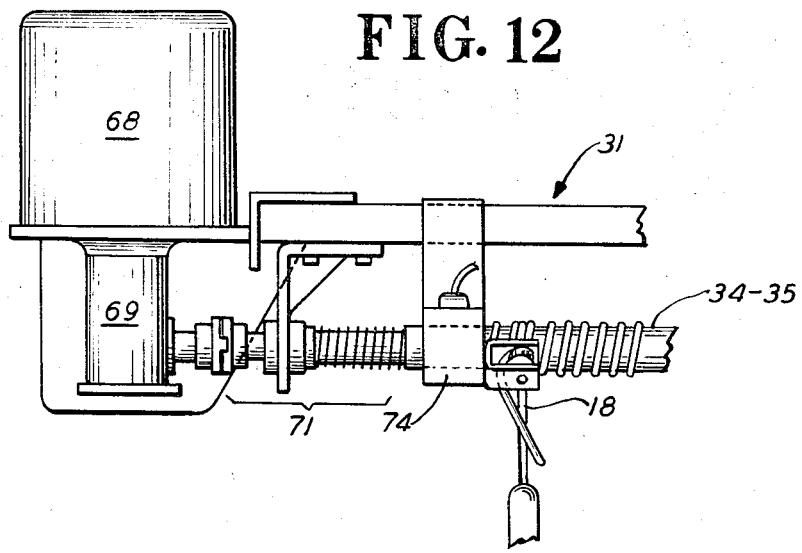

At the far end of each external conveyor on the load rack 30 there is a drive motor 66 (FIG. 11) operating through a speed reducer 67, and at the far end of each screw conveyor on the unloading rack 31 there is a drive motor 68 (FIG. 12) operating through a speed reducer 69. The reducers 67 are connected to the conveyors of the loading rack 30 through overriding clutches 70 and the reducers 69 are connected to the conveyors of the unloading racks through spring-loaded spline-type couplings 71. The drive motors 68 on the unloading racks 31 are used to drive the entire conveyor system when the loading racks are also coupled to the internal conveyors. Thus the overriding clutches 70 serve to protect the reducers 67 when the conveyors are driven from the unloading rack, and the spring-loaded spline-type couplings 71 serve to maintain tension of the drive connections between the conveyors and to allow for lengthwise variations.

Figure 13:
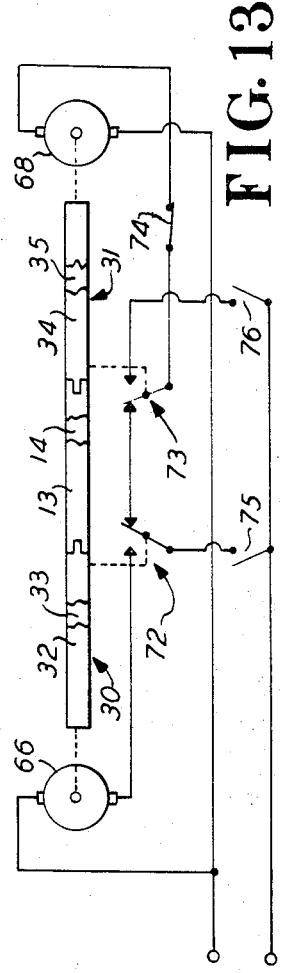
FIG. 13 is a schematic circuit diagram of the electrical drive system for the conveyors.

When the loading rack 30 is in its detached outer position it can be loaded from the far end by running the drive motors 66. However, when the conveyors 32 and 33 of the loading rack 30 are attached to the internal conveyors 13 and 14 the carriage 39 abuts against a rack-position limit switch 72 on the stationary frame to disable the drive motors 66. (FIGS. 7 and 13). When the unloading rack 31 is in its detached position away from the treating chamber it can be unloaded at the far end by running the drive motors 68. The motors 68 are rendered inoperable by a rack-position limit switch 73 (FIG. 13) when the unloading rack 31 is latched in coupled relationship with the internal conveyors. The limit switch 73 on the unloading rack is like the limit switch 72 for the loading rack. If the conveyors 32 and 33 of the loading rack are coupled at the same time to the internal conveyors 13 and 14, the limit switch 72 restores the power circuit (FIG. 13) to enable the drive motor 68 of the unloading rack to drive the entire conveyor system.

In addition there is a safety limit switch 74 mounted on the back end of the unloading rack 31 which is operated by a hanger when the same reaches the far end of the unloading rack 31. This switch is normally closed and connected in the line to the unload motor 68 as shown in FIG. 13 to stop the motor when the switch is operated.

Also, the control system includes two operator or manual switches 75 and 76 (FIG. 13) at the loading and unloading racks 30 and 31 respectively. When the loading rack 30 and chamber 10 are filled — say 90 hangers at each location — and the unloading rack 31 is empty, the operator at loading rack may close switch 75 to start unloading the chamber 10 onto the unloading rack 31 and to start simultaneoulsy the reloading of chamber 10 from the loading rack 30. This operation will continue so long as switch 75 is held closed until safety limit switch 74 on the unloading rack 31 is operated at which time all of the hangers from the chamber 10 will have been conveyed onto the unloading rack 31. When the loading and unloading racks 30 and 31 are detached from the chamber 10 the respective conveyors 32–33 and 34–35, are controlled by the respective operator switches 75 and 76.

By way of typical example, the pitch of the screw conveyors of the load and unload racks is ¾ inch and of the internal conveyor 13 and 14 is 1 ¾ inches. Further, the garments are hung in alternate groove convolutions giving a space between garments of 1 ½ inches on the load and unload racks and of 3 ½ inches in the treating chamber 10. The conveyors are driven to transfer the garments from the load rack at a rate of about 17' per minute and simultaneously from the treating chamber to the unloading rack at about 34' per minute. In view of these conditions a spiral wire ¼ inch in diameter is required for each wire helix to prevent skipping and dropping of hangers. Further, the use of round wire for the helix provides a rounded surface engaging the bearing members to reduce friction and wear.

The embodiment of my invention herein particularly shown and described is intended to be illustrative and not necessarily limitative since the same is subject to changes and modifications without departure from the scope of my invention, which I endeavor to express according to the following claims.

I claim:

1. An apparatus for treating fabric articles to provide the same with a durable press comprising an elongate treating chamber having a loading door at one end and an unloading door at the other end, a screw conveyor along the length of said chamber and journal bearings for said screw conveyor supported from the ceiling of the chamber, said screw conveyor having a spiral groove to receive hanger hooks for said articles and cause the articles to be carried lengthwise of said chamber as the conveyor is rotated, each of said journal bearings comprising an upper bearing portion and two separate lower bearing portions located beyond the ends of said upper bearing portion in unopposed relation to said upper bearing portion, said bearing portions comprising bar-shaped members traversing a multiplicity of thread convolutions of said conveyor while leaving transverse spaces therethrough via the groove convolutions of the conveyor enabling said hooks to travel through said bearings, and each of said lower bearing portions being displaced against the direction of rotation of said conveyor from a position diametrically opposite said upper portion for clearing said hanger hooks received by said screw conveyor from the side away from said lower bearing portion.

2. An apparatus for treating fabric articles to provide the same with a durable press comprising an elongate treating chamber having loading and unloading doors, a screw conveyor along the length of said chamber and journal bearings for said screw conveyor supported from the ceiling of the chamber, said screw conveyor having a spiral groove to receive hanger hooks for said articles and cause the articles to be carried lengthwise of said chamber as the conveyor is rotated, each of said journal bearings comprising an upper bearing portion and a separate lower bearing portion of plastic material traversing a multiplicity of thread convolutions of said conveyor while leaving transverse spaces therethrough via the groove convolutions of the conveyor enabling said hooks to travel through said bearings, and each of said lower portions comprising two spaced parallel bearing members having end faces tangentially engaging said conveyor at points spaced circumferentially about said conveyor and comprising a steam pipe clamped between said bearing members.

3. The apparatus set forth in claim 2 wherein said upper bearing portion is symmetrically located relative to a vertical plane through the axis of said conveyor, said lower bearing portion is shifted against the direction of rotation of said conveyor by a predetermined angle from said vertical plane, and said parallel bearing members of said lower bearing portion are displaced rectilinearly in the direction of rotation of said conveyor from a plane parallel therewith through said axis.

4. An apparatus for treating fabric articles to provide the same with a durable press, comprising an elongate treating chamber having loading and unloading doors, an internal screw conveyor in said treating chamber supported rotatably from the ceiling of the chamber, an external rack at a door of said chamber, guide rails for said rack permitting the rack to be shifted to and from said chamber to permit said door to be open and closed, said rack having a screw conveyor thereon positioned for alignment with said internal screw conveyor, coupling means engaged by shifting said rack towards said chamber to form a drive connection between said internal and external conveyors, and a latch for locking said rack in its inner engaged position.

5. The apparatus set forth in claim 4 including a drive motor on said rack for driving both said external and internal conveyors.

6. The apparatus set forth in claim 4 wherein said chamber has a loading door at one end and an unloading door at the opposite end, including a loading rack at said loading end and an unloading rack at said unloading end, guide rails at the ends of said chamber for said respective racks permitting the racks to be shifted towards and away from said chamber, a screw conveyor rotatably supported on each of said racks for coupling engagement with the internal conveyor in said chamber as the racks are shifted into their inner positions, a drive motor on each of said racks for the respective conveyor, and limit switches controlled by movement of the racks into and out of coupled relationship with said internal conveyor for abling and disabling said respective motors.

7. The apparatus set forth in claim 6 wherein the drive motor on said loading rack is rendered inoperable when said loading conveyor is coupled to said internal conveyor.

8. The apparatus set forth in claim 6 wherein the drive motor on said unloading rack is rendered inoperable when only said unloading conveyor is coupled to said internal conveyor.

9. The apparatus set forth in claim 8 including means controlled by said limit switches for enabling the drive motor on said unloading conveyor to drive the entire conveyor system when said loading conveyor is also coupled to said internal conveyor.

10. An apparatus for treating fabric articles to provide the same with a durable press, comprising an elongate treating chamber provided with doors at its opposite ends and with a screw conveyor along the length thereof, loading and unloading racks at the opposite ends of said chamber each having a screw conveyor rotatably mounted thereon, means mounting said racks for shifting movement towards and away from said chamber to bring the screw conveyors thereof into and out of coupling engagement with the internal screw conveyor in said chamber, and a drive motor for said unloading rack for driving all of said conveyors in unison whereby to unload said chamber onto said unloading rack simultaneously as said chamber is loaded from said loading rack.

11. The apparatus set forth in claim 10 including a drive motor also for the loading rack, and a one-way over-riding clutch between said drive motor and respective conveyor of said loading rack enabling the drive of said loading rack by the drive motor of said unloading rack via said internal conveyor.

12. The apparatus set forth in claim 11 including a spring loaded spline-type coupling between the drive motor and conveyor of said unloading rack to maintain tension on the drive coupling between said internal conveyor and said rack conveyors.

13. In a screw conveyor system for a durable press apparatus: the combination of a treating chamber having loading and unloading doors at the opposite ends, an internal screw conveyor rotatably supported from the top of said treating chamber and extending substantially from one of said doors to the other, said screw conveyor comprising a pipe having a helical wire secured thereon for receiving hanger hooks between wire convolutions and advancing the hangers as the conveyor is rotated, loading and unloading racks at the opposite ends of said chamber each having a screw conveyor rotatably supported thereon and positioned to enter into drive engagement with the said internal conveyor as the racks are shifted into inner positions at the ends of said chamber, a coupling means between said internal conveyor and said external conveyors of said racks adapted to form a drive engagement only when the helical wires of said conveyors have come into an even spiral registration with each other, and a drive motor on one of said racks for rotating the entire conveyor system whereby to shift said hanger hooks from said loading rack into said chamber simultaneously as the hanger hooks in said chamber are shifted onto said unloading rack.

14. The screw conveyor system set forth in claim 13 including a centering pin on the conveyor of each of said racks engageable internally with the conveyor in said chamber as the rack is moved into an inner latched position, a spring-loaded key in said centering pin biased radially outwardly therefrom, and a slot in the end portion of said internal conveyor for receiving said key to provide a drive connection between said conveyors when the helical wires on the conveyors are in registry with each other, wherein said slot in the end portion of said internal conveyor is open-ended to permit ready detachment of said racks from said internal conveyor when the racks are unlatched.

15. In an apparatus for treating fabric articles to provide the same with a durable press: the combination of an elongate treating chamber having loading and unloading doors respectively at the opposite ends thereof, an internal rotatably mounted screw conveyor in said treating chamber along the length thereof adapted for receiving the hooks of hangers for said fabric articles and for conveying the hangers along said chamber in the direction from said loading door to said unloading door as said conveyor is rotated, respective loading and unloading racks at the load and unload ends of said chamber each shiftable to and from said chamber, screw conveyors on said laoding and unloading racks moved into coupled relation with said internal conveyor as said racks are shifted toward said chamber respectively into load and unload positions, a drive motor on said unloading rack coupled to the respective screw conveyor thereof, a manual operator's switch on said loading rack, and circuit means rendered operative only when both of said rack conveyors are coupled to said internal conveyor for enabling said drive motor of the unloading rack to be started by said manual switch of the loading rack.

16. The apparatus set forth in claim 15, including a safety limit switch connected in said circuit means and mounted on said unloading rack at the far end of said respective conveyor for operation by a hanger on said respective conveyor to stop said drive motor when said hanger reaches the end of the conveyor.

* * * * *